Figure 1:
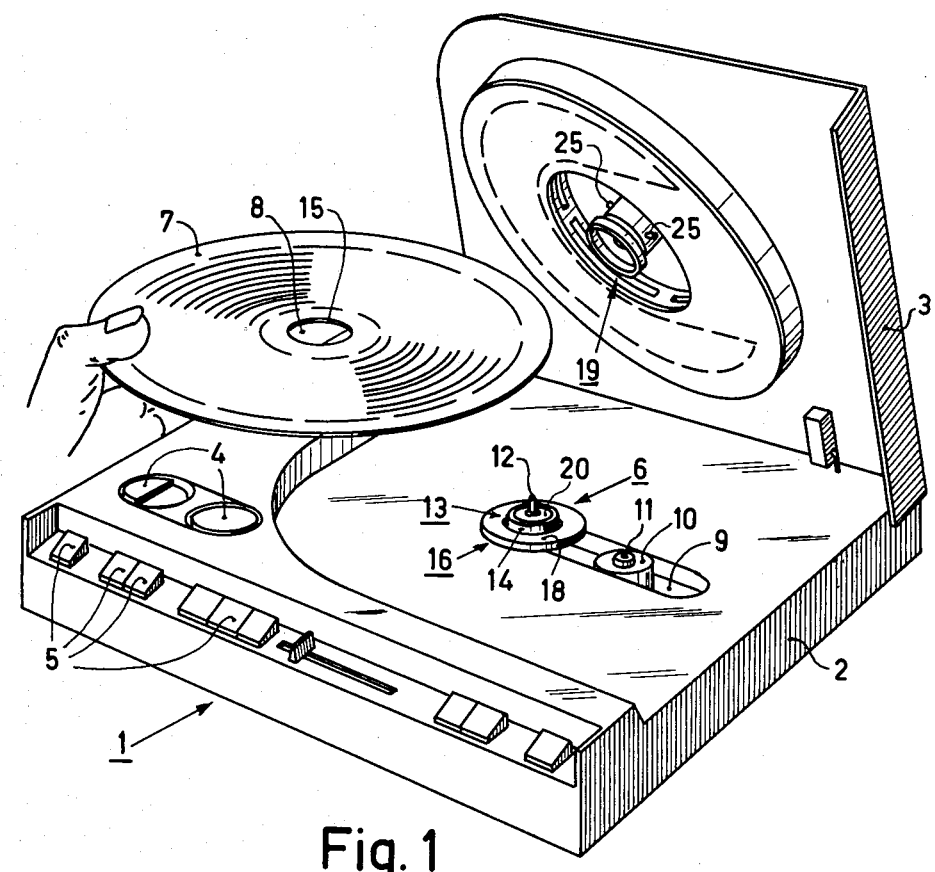

United States Patent [19]

Iemenschot

[11] 4,232,870
[45] Nov. 11, 1980

[54] CLAMPING DEVICE FOR A ROTATABLE INFORMATION CARRYING RECORD

[75] Inventor: Johannes A. Iemenschot, Eindhoven, Netherlands

[73] Assignee: U.S. Philips Corporation, New York, N.Y.

[21] Appl. No.: 47,394

[22] Filed: Jun. 11, 1979

Related U.S. Application Data

[63] Continuation of Ser. No. 734,659, Oct. 21, 1976, abandoned.

[30] Foreign Application Priority Data

Aug. 24, 1976 [NL] Netherlands ............... 7609375

[51] Int. Cl.³ .................. G11B 17/02; G01D 15/32; G11B 25/04; G11B 3/62
[52] U.S. Cl. .................. 274/39 R; 346/137; 360/86; 360/97
[58] Field of Search ............ 274/39 R, 39 A; 360/86, 360/97; 346/137

[56] References Cited

U.S. PATENT DOCUMENTS

| | | | |
|---|---|---|---|
| 3,867,724 | 2/1975 | Bruer et al. | 274/39 A |
| 3,980,308 | 9/1976 | Camerik et al. | 274/39 A |
| 4,068,851 | 1/1978 | Yamamura | 360/97 |

*Primary Examiner*—Steven L. Stephan

*Attorney, Agent, or Firm*—Thomas A. Briody; William J. Streeter; Algy Tamoshunas

[57] ABSTRACT

For driving a video record on a video player use can be made of a clamping device which comprises a drive spindle on which record supporting means are disposed which inter alia comprise: a centering member, having a centering surface whose transverse dimension varies from smaller than to greater than the diameter of the record hole, which centering surface, also during operation, co-operates with the edge of a record hole; a record loading device which during operation presses the edge of the record hole against the centering surface; and record carrying means which frictionally co-operate with the video record and which are disposed at some radial distance from the centering member. In accordance with the invention the record carrying means comprise a record carrying member which as a whole is axially movable between an upper and a lower position, which member by means of a parallel guidance is accurately coaxially movable relative to the centering member, the positioning surfaces for the frictional co-operation with a video record to be played being rigidly connected to the record carrier member and being disposed in a plane, which, regardless of the axial position of the record carrying member relative to the centering member, is always perpendicular to the axis of rotation of the drive spindle. Resilient means are provided for urging the record carrying member towards its upper position.

2 Claims, 4 Drawing Figures

CLAMPING DEVICE FOR A ROTATABLE INFORMATION CARRYING RECORD

This is a continuation, of application Ser. No. 734,659, filed Oct. 21, 1976 now abandoned.

The invention relates to a clamping device which is suitable for clamping a rotatable disk-shaped information-carrying record with a central record hole in position, and in particular for driving a video record. The device comprises: a drive spindle with a free end which spindle is rotatable about an axis of rotation; record supporting means on the drive spindle, which means comprise a centering member which is coaxial with the drive spindle. The centering member has a centering surface whose transverse dimension varies from smaller than to greater than the diameter of the record hole. The surface (also during operation) co-operates with the edge of the record hole, and record carrying means at some radial distance from the centering member. The carrying means are axially movable relative to the axis of rotation of the drive spindle and during operation frictionally co-operate with a record to be played with the aid of a positioning surface. The device also includes record loading means for pressing the edge of the record hole against the centering surface, which loading means during operation bears on a record to be played and are movable to a position opposite the centering member.

Such a clamping device is proposed in previously filed U.S. patent application Ser. No. 583,988, filed June 15, 1975 and now U.S. Pat. No. 3,980,308. This device comprises a record support which is fixed to the drive spindle, the centering member being rigidly connected to said support. The part of the centering surface which has a transverse dimension equal to the diameter of a record hold is situated at some axial distance from the other stationary parts of the record support, so that a record to be played is freely pivotable on the centering member to a limited extent. During operation the record loading means exert a resilient pressure on a record to be played, so that the edge of the record hole is resiliently pressed against the centering surface. In this previously proposed clamping device it is assumed that the record may be disposed slightly aslant on the centering member. As the record spindle gains speed centrifugal forces tilt the record into a plane of rotation which is essentially disposed at right angles to the axis of rotation of the drive spindle. In certain video players which are being developed in which the information is read from the record with the aid of a laser beam, the record is rotated with a speed of 1500 or 1800 revolutions per minute, depending on whether the line frequency is 50 or 60 Hz. For further general information pertaining to such video record players reference is made to a number of articles which have appeared in "Philips Technical Review", Vol. 33, 1973, No. 7, pp. 178-193. At a speed of 1500 or 1800 revolutions per minute rather substantial centrifugal forces are produced, so that despite the friction between the edge of the record hole and the centering member a fairly strong tilting effect is produced as a result of which the record will be positioned in said plane of rotation with comparatively high precision.

It may be desirable to use a clamping device of such a type that when the record is placed in position, it is at once disposed in a plane perpendicular to the axis of rotation of the drive spindle within small tolerance limits. In the said previously proposed clamping device additional space is needed inside the video player allowing a video record to be positioned aslant. It is the object of the invention to provide a clamping device which enables the overall height of a video record player of a similar record player to be slightly reduced without the risk of a record touching stationary parts of the player as the drive spindle gains speed. The invention is characterized in that the record carrying means comprise a record carrying member which as a whole is axially movable, coaxially with the centering member, between an (upper) position nearer the free end of the drive spindle and a (lower) position which is more remote therefrom; that an accurate parallel guidance is provided for coaxially moving the record carrying member relative to the centering member; that the positioning surface (s) for the frictional co-operation with a record to be played is (are) rigidly connected to the record carrying member, and is (are) disposed in a plane which regardless of the axial position of the record carrying member relative to the centering member, is perpendicular to the axis of rotation of the drive spindle; and that resilient means are provided for urging the record carrying member towards its upper position.

In a clamping device in accordance with the invention the record carrying member also functions as a means of bringing a record, which placed in position, in a plane which is essentially perpendicular to the axis of rotation of the drive spindle. When the record is put on, or during the time that the record loading means comes into position, the record carrying member together with the record is moved downwards along the drive spindle until the edge of the record hole is in contact with the centering surface. Should the record hole not be fully coaxial with the centering surface, the record at this stage of the positioning of the record relative to the axis of rotation may be slightly shifted over the record carrying member until the record hole co-operates with the centering surface in the desired manner. The distance over which the record carrying member is axially movable is selected so that the record carrying member can never act as an axial stop for a record to be played. The axial position of a record to be played is exclusively determined by the co-operation of the edge of the record hole with the centering surface of the centering member. The record loading means presses the edge of the record hole and the centering surface against each other, also during operation.

The record carrying member is resiliently pressed against the side of the record which faces the record loading means with the aid of resilient means which are provided for this purpose, and thus acts against the resilient action of the record loading means. The resilient means which serve for exerting pressure on the record carrying member and the record loading means may be proportioned to suit specific requirements. In this respect there are various possibilities, the most suitable choice for a specific case depending on practical conditions. It is for example possible to dimension the resilient means for the record carrying member so that by the mere weight of a record to be played the record carrying member is axially moved relative to the centering member over such a distance, that the edge of the record hole engages with the centering surface. If a record to be played is not centered correctly relative to the centering member, the record will be moved in a radial direction owing to the axial force which is exerted to the record loading means in the next phase.

In such a case the tangentially directed frictional forces which provide the driving torque and which should bring and keep the record in rotation are mainly produced at the location of the edge of the record hole, namely by the centering member. The record carrying member only contributes slightly to the driving torque.

Another possibility is to dimension the resilient means of the record carrying member to be more powerful, yet not so powerful that they cancel the action of the record loading means. In the case of such a dimensioning the record carrying member could provide a greater share of the driving torque. However, a consequence is that radial movements of the record for centering the record hole relative to the centering member are counteracted by greater frictional forces between the record and the record loading means.

During tests a clamping device has performed satisfactorily, which devices was characterized in that the centering member consisted of a cylindrical body mounted on the drive spindle and having a frustoconical end whose exterior surface served as centering surface; that the record carrying member consisted of a cylindrical sleeve with a continuous internal bore and a flange at one end; and that the parallel guidance of the record carrying member consisted of the said cylindrical sleeve and the cylindrical body of the centering member which fitted the internal bore of the sleeve with slight play. In such an embodiment the resilient means for urging the record carrying member towards it upper position may suitably comprise leaf springs which are rigidly connected to the centering surface, which springs load on the record carrying member with free ends. In the embodiment used in the tests, the leaf springs exerted a total force on the record carrying member which was only slightly less than the weight of a rigid 30 cm. video record (100 grammes).

The invention will now be described in more detail with reference to the drawing which shows an embodiment of the invention, and in which:

FIG. 1 shows a perspective view of a video player with appertaining video record.

Figure 2:
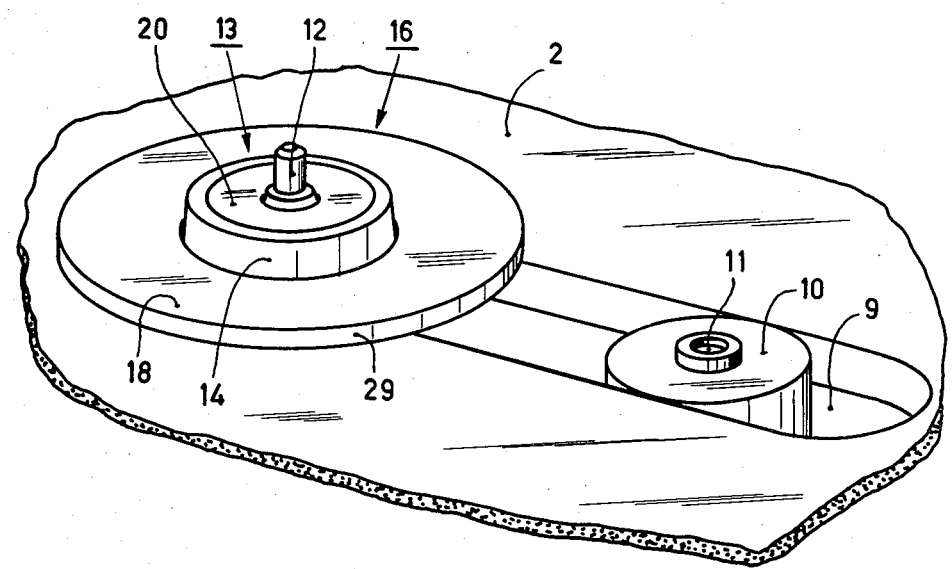
Figure 3:
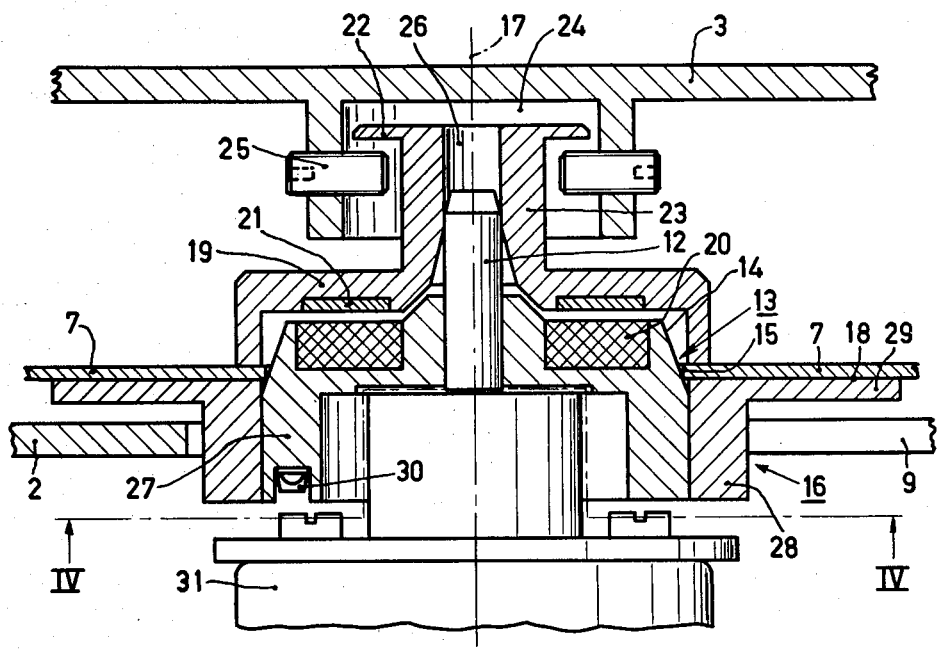
Figure 4:
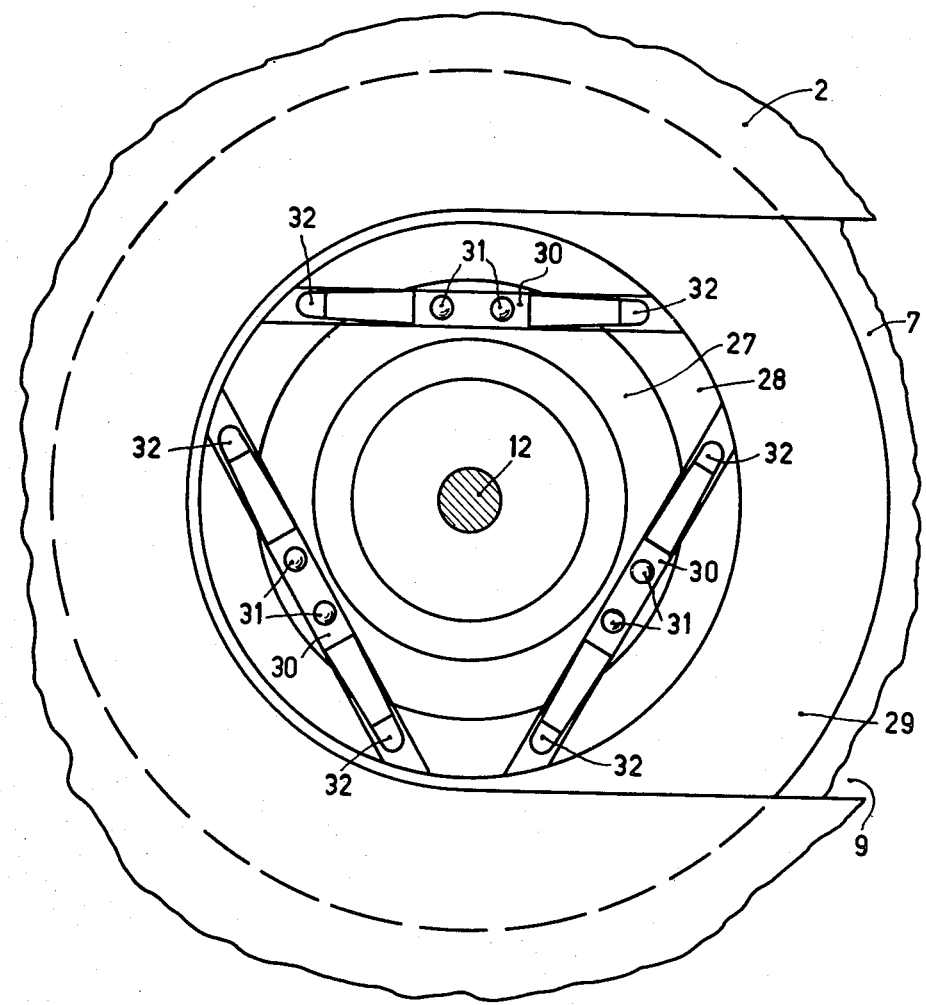

FIG. 2 on an enlarged scale shows a part of the video player of FIG. 1 near the clamping device, FIG. 3 shows a part of a cross-section of the video player of FIG. 1 across the axis of rotation of the clamping device, and FIG. 4 is an elevation in accordance with the arrows IV—IV in FIG. 3.

The video player 1 of FIG. 1 comprises a housing 2 and a hinged cover 3. At the front of the housing a number of buttons 4 and 5 are provided for controlling the various apparatus functions. At a central location the record supporting means 6 are disposed, which will be discussed in further detail. A video record 7 having a central record hole 8, can be positioned on the record supporting means so as to be driven with the required speed of 1500 or 1800 revolutions per minute, depending on whether the lines frequency is 50 or 60 Hz. Beside these means a radially extending slot 9 is formed in the upper surface of the housing 2, in which slot a focussing device 10 is movable in a radial direction with the aid of means (not shown) which are accommodated in the housing. The device is provided with an objective 11 with which a light beam from a laser source can be projected onto the underside of a record which is positioned on the clamping device and with the aid of which the light which is reflected by the record is passed to photoelectric information-detection means (not shown).

The record supporting means 6, see in particular FIG. 3, comprises a centering member 13 which is coaxial with a drive spindle 12 of an electric motor 31, which member has a centering surface 14 whose transverse dimension varies from smaller than to greater than the diameter of the record hole 8 in the video record, which centering surface, also co-operates with the edge 15 of the record hole 8. Furthermore, the record supporting means comprise a record carrying member 16. Relative to the axis of rotation 17 of the drive spindle this member is axially movable to a limited extent and frictionally co-operates with a video record to be played with the aid of positioning surface 18.

During operation a record loading means 19 which is movable to a position opposite the centering member 13 bears on the video record. In the centering member 13 an annular axially magnetized permanent-magnetic ring 20 is mounted (for example by glueing), which co-operates with a soft-iron annular disk 21 in the record loading means 19. The edge 15 of the record hole in the video record 7 is pressed against the centering surface 14 by the magnetic force which acts between the annular permanent magnetic ring 20 and the soft-iron disk 21. During operation the record loading means does not come into contact with stationary parts of the video player. A flange 22 at the top of a cylindrical portion 23 rotates in a chamber 24 in the cover 3 during operation. When the cover is opened the record loading means is withdrawn from the video record in that three bolts 25 come into contact with the flange 22 and thus exert a tensile force on the record loading means via the cover 3. An internal bore 26 comparatively accurately fits the free end of the drive spindle 12 so as to align the record loading means relative to the record supporting means.

The record carrying member 16 is movable, coaxially with the centering member 13, between an upper and a lower position. These two positions are disposed at such a distance from each other that, allowance being made for inevidable variations in the diameters of the record holes of different video records and thus also of the axial positions of video records which are positioned on the centering surface 14, the friction surface 18 is always in contact with a record to be played.

The record carrying member 16 co-operates with the centering member 13 by means of an accurate parallel guidance. This guidance comprises a cylindrical bore in the record carrying member 16 in which a cylindrical portion 27 of the centering member 13 is an accurate fit. The centering member thus consists of a cylindrical body 27 with a frustoconical end which is mounted on the drive spindle 12, whose outer surface constitutes the centering surface 14. The record carrying member 16 comprises a cylindrical sleeve 28 with the said bore and furthermore a flange 29.

The entire plane upper surface of the flange 29 functions as positioning surface for the frictional co-operation with the video record 7 to be played. This positioning surface as a whole is disposed in a plane which, regardless of the axial position of the record carrying member 16 relative to the centering member 13, is perpendicular to the axis of rotation 17 of the drive spindle 12.

For urging the record carrying member 16 to its upper position resilient means are provided in the form of three leaf springs 30 which are rigidly connected to the centering member 13, see in particular FIG. 4. With the aid of two pins 33 each of the three leaf springs 30 is connected to the centering member 13 in a central portion. The two free ends 32 press the record carrying member 16 upwards. Since the leaf springs 30 are mounted in slots in the centering member and in the record carrying member these two members are prevented from being rotated relative to each other.

The invention is not limited to the present embodiment. Alternative embodiments can be derived from the described embodiment. As an example, it is not necessary that the centering surface 14 consists of a continuous conical surface. It is for example possible to form grooves in this surface or, conversely, to form three or more ridges on this surface. The positioning surface 18 in the present embodiment consists of a single surface. However, the same effect might also be achieved when on the flange 29 a plurality of local elevations, for example three, were formed, or if instead of the flange 29 a number of spoke-shaped projections were used. It is possible to provide the positioning surface 18, or as the case may be any further positioning surfaces, with a surface layer of a material which in co-operation with the material of a video record exhibits a high coefficient of friction, for example rubber. However, it remains essential for the invention that a video record which is positioned on the record carrying member is always disposed in a plane perpendicular to the axis 17 of rotation of the drive spindle 12 and that during operation the edge 15 of the record hole is in contact with the centering surface 14 of the centring member 13. Thus, it is guaranteed that before the drive spindle 12 has gained speed, the video record has already substantially assumed its ultimate coaxial position transverse to the axis 17 of rotation.

What is claimed is:

1. A clamping device for clamping a rotatable disc-shaped record carrier provided with a center hole into position, comprising:

a drive spindle having a driven end and a free end, and being rotatable about an axis of rotation and axially immovable;

a centering member pivotable about said axis of rotation and being provided with a centering surface whose diameter varies from smaller than to greater than the diameter of the record hole, said centering surface being in contact with the edges of said record center hole during the rotation of the record and said centering member being axially immovable;

record loading means movable to a position opposite the centering member and bearing on the record in this position for pressing the centering surface against the edge of the record center hole;

record carrier means provided with a record support surface radially spaced from said centering surface of said centering member for immediately confining said record carrier to a position perpendicular to the axis of rotation of said drive spindle, and for lowering the record carrier onto said centering surface while maintaining the perpendicular relationship between the record carrier and the axis of rotation of said drive spindle during axial and rotational motion of the record carrier means;

and means for axially resiliently biasing the record carrier means toward the record carrier with a force less than that necessary to overcome the weight of the record combined with the pressing force of the record loading means, thereby facilitating the lowering of said record carrier.

2. A clamping device as recited in claim 1, wherein the resilient biasing means comprises leaf springs connected between the record carrier means and the centering member.

* * * * *